(12) United States Patent
Sloss

(10) Patent No.: US 9,243,542 B2
(45) Date of Patent: *Jan. 26, 2016

(54) SYSTEMS AND METHODS FOR AN EXHAUST GAS TREATMENT SYSTEM

(71) Applicant: Ford Global Technologies, LLC, Dearborn, MI (US)

(72) Inventor: Jeffrey David Sloss, Grosse Pointe Park, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 34 days.

This patent is subject to a terminal disclaimer.

(21) Appl. No.: 14/148,607

(22) Filed: Jan. 6, 2014

(65) Prior Publication Data

US 2014/0116030 A1    May 1, 2014

Related U.S. Application Data

(63) Continuation of application No. 13/293,873, filed on Nov. 10, 2011, now Pat. No. 8,667,779.

(51) Int. Cl.
*F01N 3/00* (2006.01)
*F01N 11/00* (2006.01)
*F01N 3/20* (2006.01)

(52) U.S. Cl.
CPC .............. *F01N 11/00* (2013.01); *F01N 3/2026* (2013.01); *F01N 2410/06* (2013.01); *F01N 2560/02* (2013.01); *Y02T 10/26* (2013.01)

(58) Field of Classification Search
USPC ........... 60/274, 275, 276, 277, 286, 295, 297, 60/300, 303, 311
See application file for complete search history.

(56) References Cited

U.S. PATENT DOCUMENTS

| | | | | |
|---|---|---|---|---|
| 3,581,489 | A * | 6/1971 | Camin et al. .................... | 60/275 |
| 5,355,671 | A | 10/1994 | Maus et al. | |
| 5,404,720 | A | 4/1995 | Laing | |
| 5,477,035 | A * | 12/1995 | Matsumoto et al. .......... | 219/635 |
| 5,601,743 | A * | 2/1997 | Mednikov et al. ............ | 219/635 |
| 6,114,675 | A * | 9/2000 | Wada et al. .................... | 219/645 |
| 7,090,811 | B2 | 8/2006 | Cho et al. | |
| 7,284,365 | B2 * | 10/2007 | Abe ............................... | 60/277 |
| 8,667,779 | B2 * | 3/2014 | Sloss .............................. | 60/277 |
| 8,863,496 | B2 * | 10/2014 | Mitani et al. ................... | 60/227 |
| 2004/0031386 | A1 | 2/2004 | Rauchfuss et al. | |
| 2007/0068157 | A1 | 3/2007 | Kurtz | |
| 2007/0199380 | A1 | 8/2007 | Daoud | |

FOREIGN PATENT DOCUMENTS

WO        2010103834 A1    9/2010

* cited by examiner

*Primary Examiner* — Binh Q Tran
(74) *Attorney, Agent, or Firm* — Julia Voutyras; Alleman Hall McCoy Russell & Tuttle LLP

(57) ABSTRACT

Various systems and methods are provided for an exhaust gas treatment system. In one example, a system includes an exhaust gas treatment device and a wire wrapped around an exterior circumference of the exhaust gas treatment device. Continuity of the wire is monitored such that degradation of the wire due to degradation of the exhaust gas treatment device is indicated.

18 Claims, 4 Drawing Sheets

SYSTEMS AND METHODS FOR AN EXHAUST GAS TREATMENT SYSTEM

CROSS REFERENCE TO RELATED APPLICATIONS

The present application is a continuation of U.S. patent application Ser. No. 13/293,873, entitled "Systems and Methods for an Exhaust Gas Treatment System," filed on Nov. 10, 2011, the entire contents of which are hereby incorporated by reference for all purposes.

TECHNICAL FIELD

The present application relates to methods and systems for diagnosing degradation of a component of an exhaust gas treatment system coupled to an internal combustion engine.

BACKGROUND AND SUMMARY

An exhaust gas treatment device may be included in an exhaust system of an engine in order to reduce regulated emissions. In one example, the exhaust gas treatment device may include a catalyst or particulate filter which is formed of a ceramic brick. Due to various conditions, such as debris striking the catalyst or particulate filter or a degraded support system for the catalyst or particulate filter, the ceramic brick may crack. As such, efficiency of the catalyst or particulate filter may be reduced resulting in increased back pressure in the exhaust system and reduced engine performance and/or an increase in regulated emissions.

The inventors herein have recognized the above issue and have devised an approach to at least partially address it. Thus, in one example, a system is provided. The system includes a catalyst and a wire wrapped around an exterior of the catalyst. The system further includes a sensor configured to electrically couple ends of the wire and to monitor electrical continuity of the wire.

The wire may be wrapped around the catalyst such that degradation of the catalyst, such as cracking, may result in degradation of the wire. For example, the wire may be wrapped around the exterior of the catalyst in a spiral configuration such that a single wire is in contact with a greater surface area of the catalyst. When degradation of the wire occurs, such as when the wire breaks, electrical continuity of the wire may be reduced or broken. Thus, by monitoring electrical continuity of the wire via the sensor, degradation of the catalyst may be determined and indicated, and further default action can be taken.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to various embodiments of systems and methods for an exhaust system which includes an exhaust gas treatment device. In one example embodiment, a system comprises a catalyst and a wire wrapped around an exterior of the catalyst. The system further comprises a sensor configured to electrically couple ends of the wire and to monitor electrical continuity of the wire. In such a configuration, the wire is contiguous with the exterior of the catalyst such that if degradation such as cracking of the catalyst occurs, degradation of the wire may also occur. As a result, continuity of the wire may be reduced or broken and degradation of the catalyst may be indicated. In some examples, the wire may be wrapped around the exterior of the catalyst in a spiral configuration such that one wire may cover a greater surface area of the catalyst and only a single wire is needed to monitor the catalyst. Further, in some embodiments, the wire may be coupled to a resistive heater such that the wire may heat the catalyst when a temperature of the catalyst is less than a threshold temperature during cold start conditions.

Figure 1:
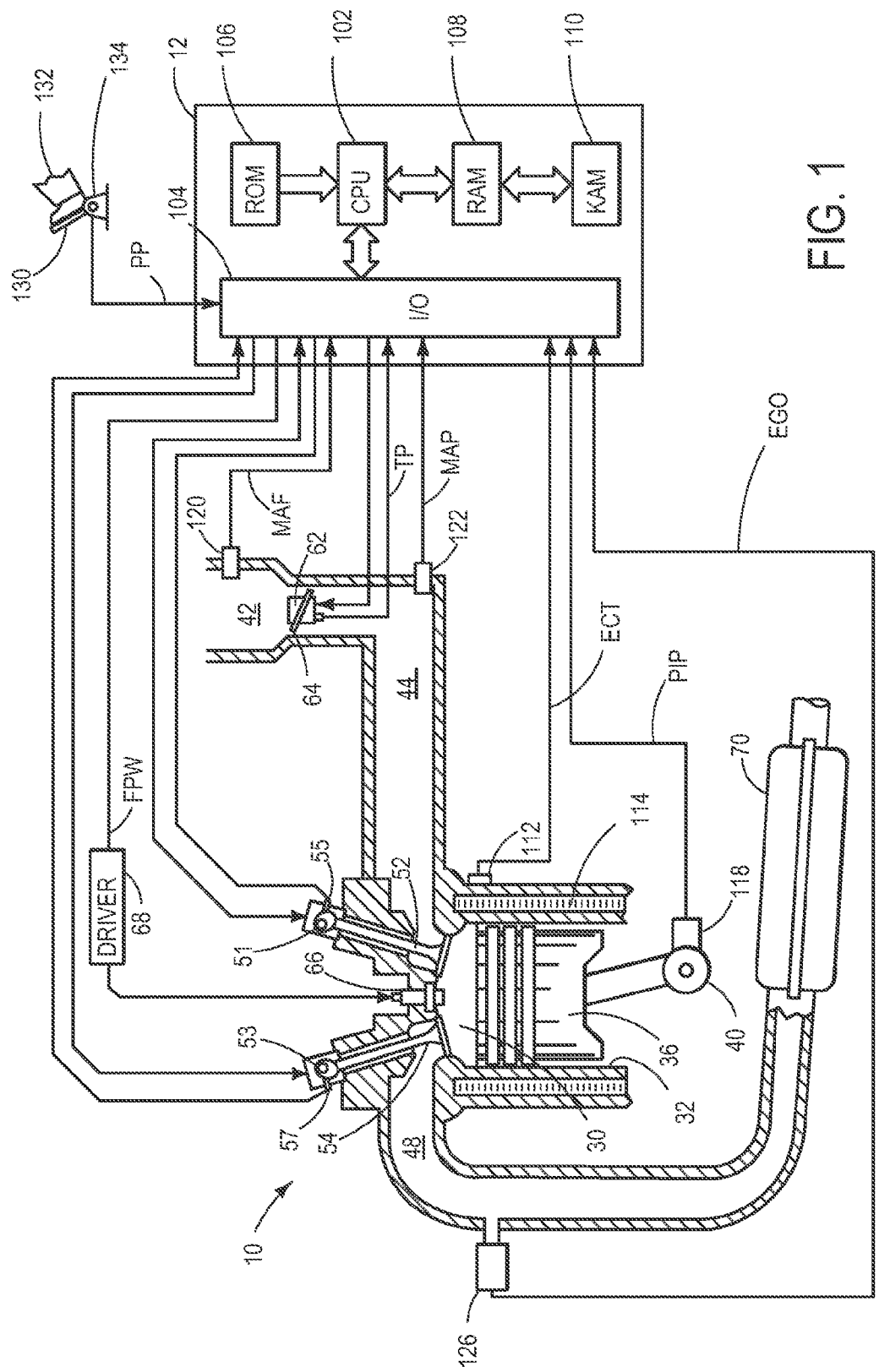
FIG. 1 shows a schematic diagram of an engine with an exhaust gas treatment system.

FIG. 1 is a schematic diagram showing one cylinder of multi-cylinder engine 10, which may be included in a propulsion system of an automobile. Engine 10 is controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber (i.e., cylinder) 30 of engine 10 may include combustion chamber walls 32 with piston 36 positioned therein. Piston 36 is coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

As depicted, combustion chamber 30 receives intake air from intake manifold 44 via intake passage 42 and exhausts combustion gases via exhaust passage 48. Intake manifold 44 and exhaust passage 48 can selectively communicate with combustion chamber 30 via respective intake valve 52 and exhaust valve 54. In some embodiments, combustion chamber 30 may include two or more intake valves and/or two or more exhaust valves.

In this example, intake valve 52 and exhaust valves 54 are controlled by cam actuation via respective cam actuation systems 51 and 53. Cam actuation systems 51 and 53 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 52 and exhaust valve 54 may be determined by position sensors 55 and 57, respectively. In alternative embodiments, intake valve 52 and/or exhaust valve 54 may be controlled by electric valve actuation. For example, cylinder 30 may alternatively include an intake valve controlled via electric valve actuation and an exhaust valve controlled via cam actuation including CPS and/or VCT systems.

Fuel injector 66 is shown coupled directly to combustion chamber 30 for injecting fuel directly therein in proportion to the pulse width of signal FPW received from controller 12 via electronic driver 68. In this manner, fuel injector 66 provides what is known as direct injection of fuel into combustion chamber 30. The fuel injector may be mounted in the side of the combustion chamber or in the top of the combustion chamber, for example. Fuel may be delivered to fuel injector 66 by a fuel system (not shown) including a fuel tank, a fuel pump, and a fuel rail. In some embodiments, combustion chamber 30 may alternatively or additionally include a fuel injector arranged in intake manifold 44 in a configuration that provides what is known as port injection of fuel into the intake port upstream of combustion chamber 30.

Intake passage 42 further includes a throttle 62 having a throttle plate 64. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to controller 12 by throttle position signal TP. Intake passage 42 may include a mass air flow sensor 120 and a manifold air pressure sensor 122 for providing respective signals MAF and MAP to controller 12.

Figure 2:
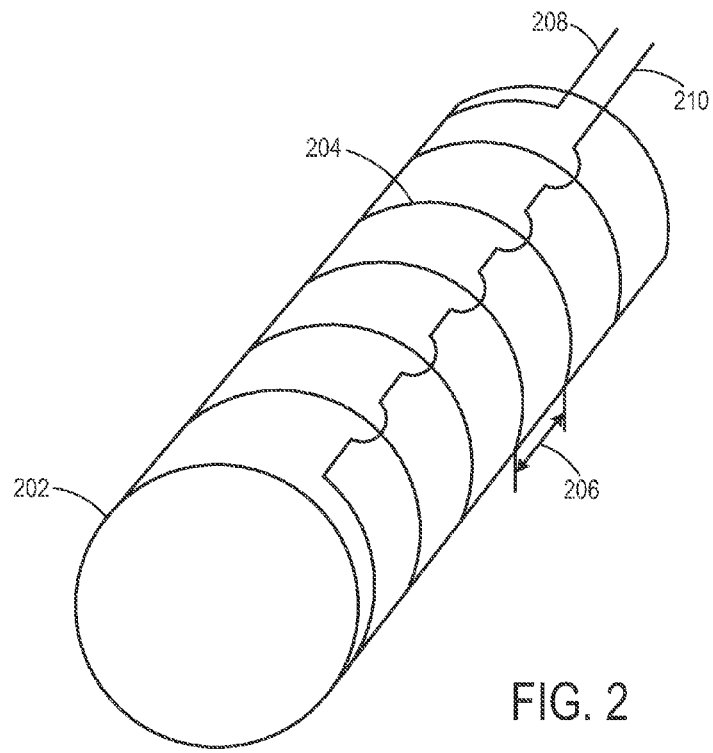
FIG. 2 shows a schematic diagram of a ceramic brick wrapped with a wire.
Figure 3:
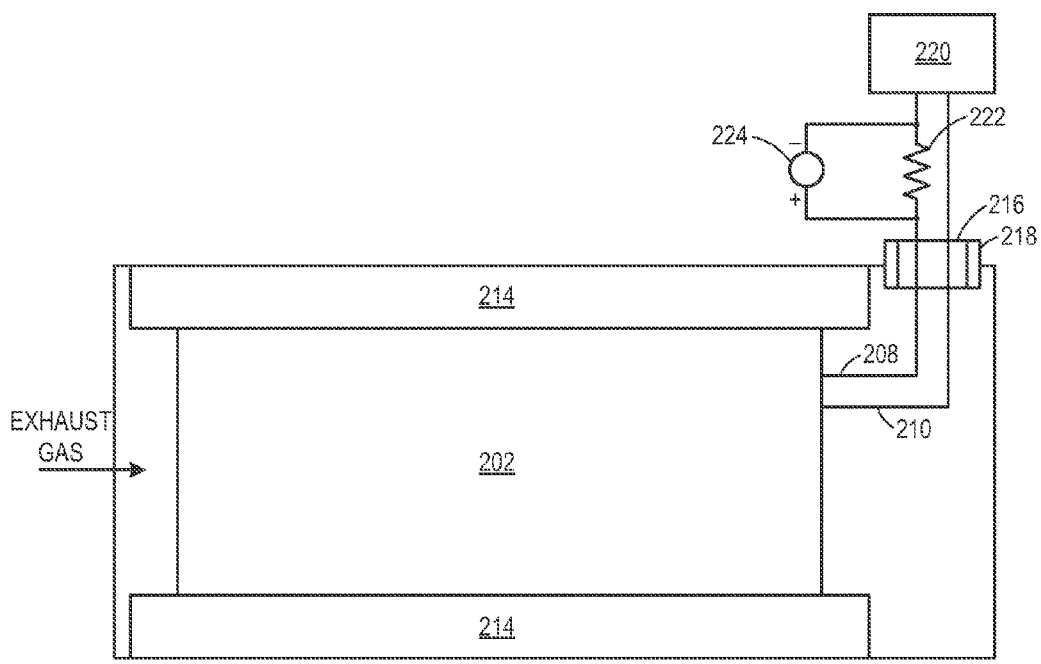
FIG. 3 shows a schematic diagram of an exhaust gas treatment device which includes a ceramic brick wrapped with a wire.

Exhaust gas sensor 126 is shown coupled to exhaust passage 48 upstream of emission control device 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a $NO_x$, HC, or CO sensor. Exhaust gas sensor 126 may be part of an exhaust gas treatment system which further includes emission control device (e.g., exhaust gas treatment device) 70, which is shown arranged along exhaust passage 48 downstream of exhaust gas sensor 126. Emission control device 70 may be a three way catalyst (TWC), $NO_x$ trap, particulate filter, various other emission control devices, or combinations thereof. In some embodiments, during operation of engine 10, emission control device 70 may be periodically reset by operating at least one cylinder of the engine within a particular air/fuel ratio. FIGS. 2-3 show embodiments of an exhaust gas treatment device which is wrapped with a wire such that continuity of the wire may be monitored and degradation of the exhaust gas treatment device may be determined, as will be described in greater detail below.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure signal, MAP, from sensor 122. Engine speed signal, RPM, may be generated by controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft.

Storage medium read-only memory 106 can be programmed with computer readable data representing instructions executable by processor 102 for performing the methods described below as well as other variants that are anticipated but not specifically listed.

In one example, the exhaust gas treatment system includes a sensor coupled to a wire wrapped around an exterior of the exhaust gas treatment device and in communication with controller 12. The sensor may monitor electrical continuity of the wire, for example, and send a signal to the controller when continuity of the wire is reduced or broken which may occur when degradation, such as cracking, of the exhaust gas treatment device occurs. In this manner, a fault code may be set in the controller and degradation of the exhaust gas treatment device may be indicated such that an operator of the vehicle is notified.

As described above, FIG. 1 shows only one cylinder of a multi-cylinder engine, and each cylinder may similarly include its own set of intake/exhaust valves, fuel injector, spark plug, etc.

FIG. 2 shows an example embodiment of ceramic brick 202, which may be a component of device 70 described above with reference to FIG. 1, for example. The exhaust gas treatment device may include one or more ceramic bricks, such as ceramic brick 202, for example. In the example embodiment of FIG. 2, degradation of ceramic brick 202 may be determined based on wire 204 wrapped around an exterior circumference of ceramic brick 202.

Ceramic brick 202 may be part of a catalyst or a particulate filter, for example. As an example, ceramic brick 202 may be coated with a wash coat, such as an aluminum oxide wash coat or a platinum group metals wash coat. As such, ceramic brick 202 may be a substrate on which reactions that reduce exhaust emissions are facilitated via the wash coat. Further, ceramic brick 202 may have a honeycomb configuration. When a ceramic brick with a honeycomb configuration cracks, the brick may shift or pieces of the broken brick may move around such that the ceramic brick becomes clogged resulting in an increased backpressure on the engine system and reduced engine performance. As will be described in greater detail below with reference to FIG. 3, ceramic brick 202 may be surrounded by an insulating mat which holds the ceramic brick in place and protects the ceramic brick to reduce a possibility of degradation of the ceramic brick.

Further, as depicted in FIG. 2, the exterior of ceramic brick 202 is wrapped with single wire 204 such that degradation of ceramic brick 202 may be monitored by monitoring electrical continuity of wire 204. Wire 204 is wrapped contiguously around an exterior circumference of ceramic brick 202 in a spiral configuration such that a single wire may be used while maximizing a surface area of the ceramic brick in contact with the wire. As a non-limiting example, a spacing 206, or pitch, between windings of the spiral configuration may be between 1 cm and 2 cm, for example. In other examples, the windings may have another suitable spacing, such as less than 1 cm or greater than 2 cm. In another example, the pitch may be at least partially dependent on a diameter of the ceramic brick.

For example, as the diameter increases, the pitch may decrease. As another example, a ratio of the pitch of the windings relative to the diameter may be within a range of 1/10 to 1/100, for example. In some examples, the pitch of the windings may be non-linear. For example, because certain positions along the length of the ceramic brick may be more susceptible to cracking, the wire may be wound more tightly around the ceramic brick in such a region. As such, the pitch of the windings may increase and then decrease (or vice versa) along the flow direction through the ceramic brick. Further, in the example embodiment depicted in FIG. 2, the spiral configuration includes six windings. The number of windings is not limited to six, however, as the number of windings may depend on desired winding spacing and a length of the ceramic brick.

In other embodiments, a plurality of wires may be wrapped around the exterior circumference of the ceramic brick. In some examples, the wire or wires may be at least partially embedded in the ceramic brick. In such an example, the wire(s) may be embedded in the ceramic material when the brick is formed. In embodiments in which the exhaust gas treatment device includes more than one ceramic brick, each of the ceramic bricks may be wrapped with one or more wires such that each of the ceramic bricks may be monitored for degradation, for example.

Continuing with FIG. 2, first end 208 of wire 204 extends from an end of ceramic brick 202 such that first end 208 may be coupled to a sensor which monitors continuity of the wire, as described below with reference to FIG. 3. Second end 210 of wire 204 traverses over the windings of the spiral configuration and extends from the same end of ceramic brick 202 such that second end 210 may be coupled to the same sensor as first end 208. In such a configuration, wire 204 may be insulated, at least in locations where second end 210 of wire 204 crosses the windings of wire 204, for example.

FIG. 3 shows a schematic diagram of an example embodiment of an exhaust gas treatment device 200 including ceramic brick 202 positioned in a can 212. In some examples, can 212 may include one ceramic brick. In other examples, can 212 may include a plurality of ceramic bricks. Can 212 may be made of stainless steel, for example, and may be coupled to the exhaust passage of the engine such that exhaust gas enters one side of can 212, passes through ceramic brick 202, and exits an opposite side of can 212.

Ceramic brick 202 may be held in place in can 212 via insulating mat 214. For example, as shown, mat 214 is disposed between an exterior surface of ceramic brick 202 and an interior surface of can 212 and surrounds a circumference of ceramic brick 202. Mat 214 may be configured to absorb temperature and/or mechanical shocks such that degradation of ceramic brick 202 is reduced. For example, by absorbing mechanical shocks, cracking of ceramic brick 202 may be reduced. In the example embodiment of FIG. 3, mat 214 is further configured to insulate the wire wrapped around ceramic brick 202 from contacting can 212. Further, mat 214 is positioned such that wire 204 does not contact exhaust gas flowing through can 212.

First and second ends 208 and 210 of wire 204 extend from ceramic brick 202 and pass through ceramic insulator 216. Ceramic insulator 216 may be brazed or cemented to, for example, boss 218 which is welded in can 212. In this manner, wire 204 may extend to an outside of can 212 without contacting can 212.

Outside of can 212, first and second ends 208 and 210 of wire 204 are coupled to sensor 220. Sensor 220 is configured to electrically couple the ends of wire 204 such that continuity of wire 204 may be monitored. In one example, sensor 220 may electrically couple the ends of wire 204 and measure a resistance in the circuit. If the resistance is greater than a threshold resistance, reduced continuity may be indicated. Sensor 220 may be in communication with a controller, such as controller 12 described above with reference to FIG. 1, such that degradation of the ceramic brick may be indicated. For example, continuity of wire 204 may be reduced or broken when ceramic brick 202 cracks resulting in degradation of wire 204.

In some embodiments, such as shown in FIG. 3, resistor 222 may be coupled to wire 204. In the embodiment shown in FIG. 3, resistor 222 is coupled to first end 208 of wire 204, however, in other embodiments, resistor 222 may be coupled to second end 210 of wire 204. In some examples, more than one resistor may be coupled to wire 204. Resistor 222 may be part of a resistive heater, for example, which uses battery current 224 from a battery of the engine to heat wire 204. By heating wire 204, ceramic brick 202 may be heated during conditions such as cold engine start when a temperature of ceramic brick 202 is less than a threshold temperature, as will be described in greater detail below with reference to FIG. 5.

Thus, a wire may be contiguously wrapped around exterior circumference of a ceramic brick of an exhaust gas treatment device. The wire may be wrapped in a spiral configuration such that a single wire may be used while covering a greater surface area of the exhaust gas treatment device. When degradation of the exhaust gas treatment device, such as cracking, occurs, degradation of the wire may also occur. As such, by monitoring continuity of the wire via a continuity sensor, degradation of the catalyst may be determined. Further, the wire may additionally be employed to heat the exhaust gas treatment device when a resistive heater is coupled to the wire.

Figure 4:
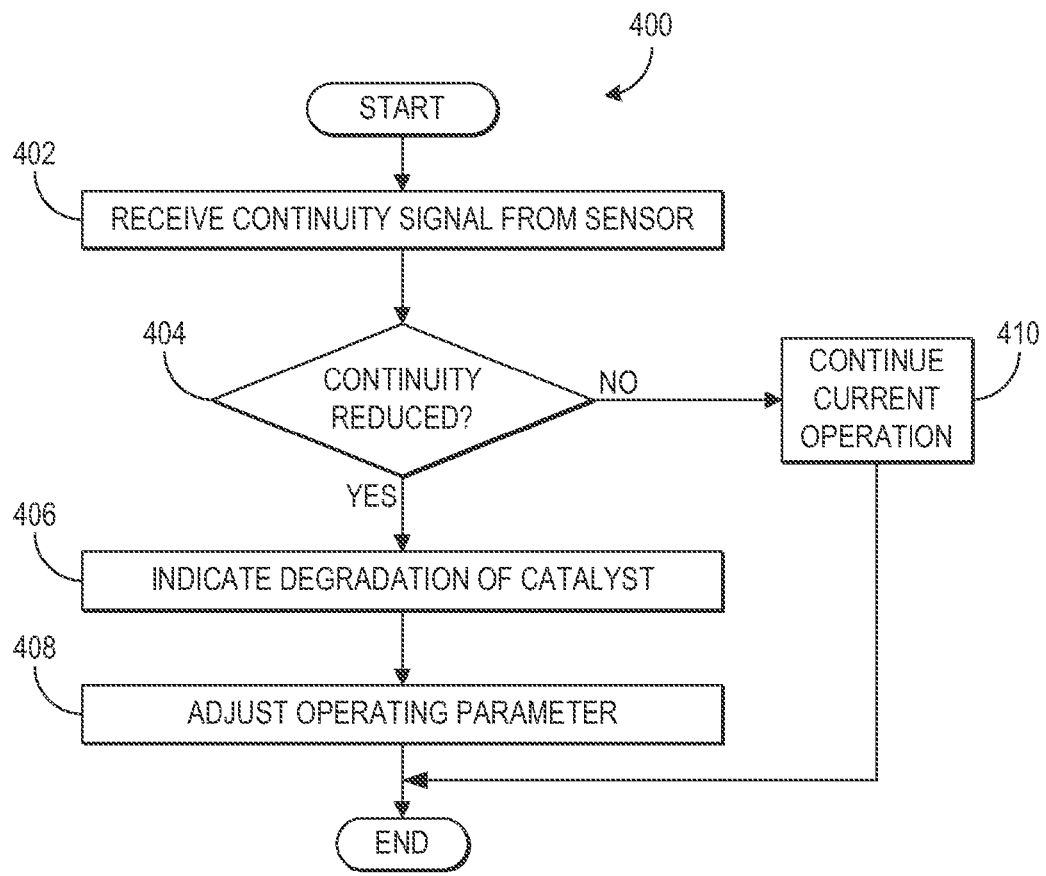
FIG. 4 shows a flow chart illustrating a routine for indicating degradation of a catalyst of an exhaust gas treatment system.
Figure 5:
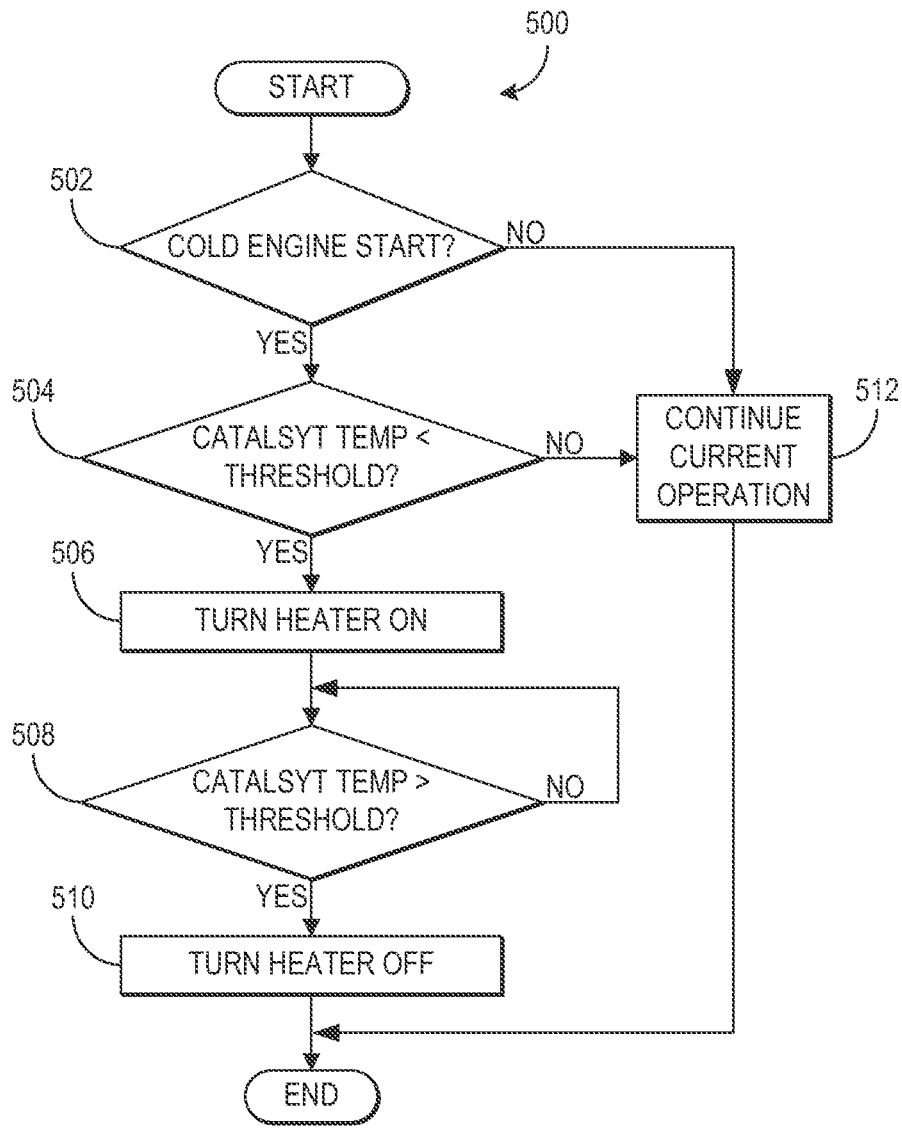
FIG. 5 shows a flow chart illustrating a routine for heating a catalyst in an exhaust gas treatment system.

FIGS. 4 and 5 show flow charts illustrating routine for an exhaust gas treatment device, such as a catalyst or particulate filter, which includes a ceramic brick wrapped with a wire, such as ceramic brick 202 wrapped with wire 204 described above with reference to FIGS. 2 and 3. FIG. 4 shows a routine for determining degradation of the exhaust gas treatment device while FIG. 5 shows a routine for heating the exhaust gas treatment device during cold engine start conditions. FIGS. 4 and 5 are described with reference to the ceramic brick as a catalyst. It should be understood, however, the routines may be applied to any ceramic brick which forms an exhaust gas treatment device such as a catalyst, particulate filter, or the like. Further, it should be understood, the routines described with reference to FIGS. 4 and 5 may be carried out via the same controller and may be carried out at the same or different times.

FIG. 4 shows a routine 400 for determining degradation of a catalyst, such as a catalyst which includes one or more ceramic bricks each wrapped with a wire. Specifically, routine 400 indicates degradation of the catalyst based on electrical continuity of the wire wrapped around the exterior of the ceramic brick.

At 402 of routine 400, a continuity signal is received from the sensor. As described above, the sensor may electrically couple the two ends of the wire and determine a resistance of the circuit, for example. When a resistance of the circuit is greater than a threshold resistance, degradation of the wire may be indicated. The threshold resistance may vary based on the material of the wire or the like, for example.

At 404, it is determined if continuity of the wire is reduced or broken. For example, because the wire is contiguous with the catalyst, if the catalyst cracks, the wire may break resulting in reduced or broken continuity of the wire. If it is determined that continuity is not reduced or broken, routine 400 moves to 410 and current operation is continued.

On the other hand, if it is determined that continuity is reduced or broken, degradation of the catalyst is indicated. For example, a fault code may be set in the controller. Once the fault code is set, a malfunction indicator light may be turned on such that an operator of the vehicle is notified of the degraded catalyst.

At 408 of routine 400, an operating parameter is adjusted responsive to the indication of degradation of the catalyst. The engine operating parameter may be engine speed, engine load, vehicle speed, etc. For example, the engine system may enter a failure mode effects management (FMEM) mode or limp-home mode such that the vehicle may continue to operate, however performance and/or driveability may be reduced. In one example, engine speed and/or an engine speed limit may be reduced. In another example, vehicle speed may be reduced. In this manner, vehicle performance may be reduced, however, a vehicle operator may still drive the vehicle to a service center or the like such that the catalyst may be replaced. Further, one or more engine parameters may be adjusted such that a reduced level of regulated emissions is exhausted from the engine.

Thus, continuity of a wire wrapped around the exterior circumference of a catalyst may be monitored. When continuity of the wire is reduced or broken, degradation of the catalyst may be indicated and an operator of the vehicle may be notified. Further, one or more engine operating parameters may be adjusted such that engine operation may still be carried out with reduced emissions and/or reduced performance until the catalyst is replaced.

Continuing to FIG. 5, a routine 500 for heating a catalyst, such as a catalyst that includes a ceramic brick wrapped with a wire, as described above, is shown. Specifically, routine 500 determines if the catalyst needs to be warmed up during a cold engine start and heats the catalyst accordingly.

At 502 of routine 500, it is determined if the engine is under cold start conditions. For example, it may be determined that the engine is under a cold start if a coolant temperature is less than a threshold temperature or if a duration since the last engine shutdown is greater than a threshold duration. If it is determined that the engine is not under cold start conditions, routine 500 moves to 512 and current operation is continued.

On the other hand, if it is determined that the engine is under cold start conditions, routine 500 proceeds to 504 where it is determined if the catalyst temperature is less than a threshold temperature. The threshold temperature may be a temperature at which the catalyst is warmed-up, for example, and reactions which reduce regulated emissions, such as $NO_x$, may occur. If it is determined that the catalyst temperature is greater than the threshold temperature, routine 500 moves to 512 and current operation is continued.

Instead, if it is determined that the catalyst temperature is less than the threshold temperature, the routine continues to 506 where a heater is turned on. As described above with reference to FIG. 3, the wire wrapped around the exterior of the catalyst may include a resistive heater. In such an example, current may be supplied to the resistive head from the vehicle battery.

At 508, it is determined if the catalyst temperature is greater than the threshold temperature. If the catalyst temperature is not greater than the threshold temperature, the heater continues to heat the catalyst. On the other hand, if it is determined that the catalyst temperature is greater than the threshold temperature, the heater is turned off at 510 of routine 500.

In this manner, a wire wrapped around the catalyst to monitor electrical continuity of the catalyst may additionally be used to heat the catalyst during cold start conditions for faster catalyst warm-up. For example, the resistive heater may be turned on responsive to a catalyst temperature less than a threshold temperature and operated until the catalyst reaches the threshold temperature.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application.

Such claims, whether broader, narrower, equal, or different in scope to the original claims, also are regarded as included within the subject matter of the present disclosure.

The invention claimed is:

1. A method for an exhaust gas treatment system, comprising:
    indicating degradation of a catalyst of the exhaust gas treatment system via a controller coupled to a sensor, based on electrical continuity of a wire wrapped around an exterior of the catalyst, the sensor configured to electrically couple ends of the wire and to monitor the electrical continuity of the wire; and
    reducing an engine speed limit responsive to the indication of degradation.

2. The method of claim 1, further comprising heating the catalyst via the wire when a temperature of the catalyst is less than a threshold temperature.

3. The method of claim 1, wherein the wire does not contact exhaust gas flowing through the catalyst.

4. The method of claim 1, wherein indicating degradation includes setting a fault code in the controller.

5. The method of claim 1, wherein indicating degradation includes turning on an indicator light.

6. The method of claim 1, wherein the wire is wrapped around the catalyst in a spiral configuration with a spacing of 1 cm to 2 cm between windings of the spiral configuration.

7. An exhaust system, comprising:
a catalyst disposed in an exhaust passage of an engine;
a single wire wrapped around an exterior circumference of the catalyst in a spiral configuration;
a sensor configured to electrically couple ends of the wire and to monitor electrical continuity of the wire; and
a controller in communication with the sensor and configured to indicate degradation of the catalyst when electrical continuity of the wire is reduced, and to adjust an operating parameter responsive to the indication of degradation.

8. The exhaust system of claim 7, wherein indicating degradation includes one or more of setting a fault code in the controller and turning on an indicator light.

9. The exhaust system of claim 7, wherein the wire is wrapped around the exterior circumference of the catalyst, and one end of the wire traverses over windings of the spiral configuration without electrically contacting the windings, with both ends of the wire extending from a same end of the catalyst.

10. The exhaust system of claim 9, wherein at least part of the wire is insulated such that the one end of the wire that traverses over the windings of the spiral configuration does not electrically contact the windings of the spiral configuration.

11. The exhaust system of claim 7, wherein the wire further includes a resistor, and the controller is further configured to supply current to the resistor to heat the wire for catalyst heating when a temperature of the catalyst is less than a threshold temperature.

12. A system, comprising:
a particulate filter;
only a single wire spirally wrapped around an exterior of the filter;
a sensor configured to electrically couple ends of the wire and to monitor electrical continuity of the wire; and
a controller in communication with the sensor and configured to indicate degradation of the filter when electrical continuity of the wire is reduced, and to adjust an operating parameter responsive to the indication of degradation.

13. The system of claim 12, wherein a spacing between windings of a spiral configuration is between 1 cm and 2 cm.

14. The system of claim 13, wherein one end of the wire traverses over the windings of the spiral configuration without electrically contacting the windings of the spiral configuration, with both ends of the wire extending from a same end of the filter.

15. The system of claim 12, wherein a resistor is coupled to the wire and configured to heat the filter during a cold engine start.

16. The system of claim 12, wherein a circumference of the filter is surrounded by a mat, the mat disposed between an exterior surface of the filter and an interior surface of a filter can and configured to insulate the wire from contacting the filter can.

17. The system of claim 12, wherein the filter is formed of a ceramic brick.

18. The system of claim 12, wherein the wire is contiguous with the exterior of the filter.

* * * * *